Inventor,
Herman Cohen,
by Thomson + Thomson
Attys.

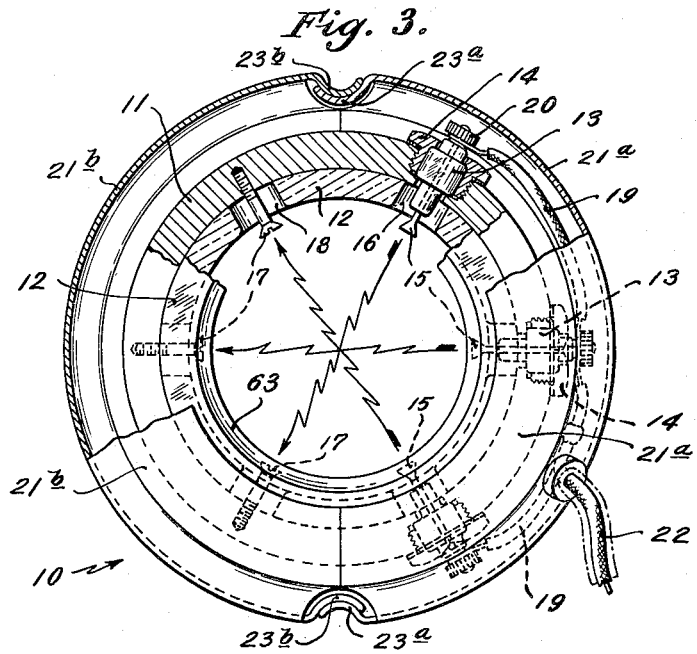
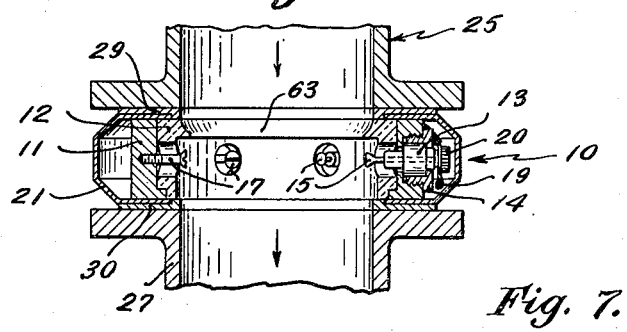
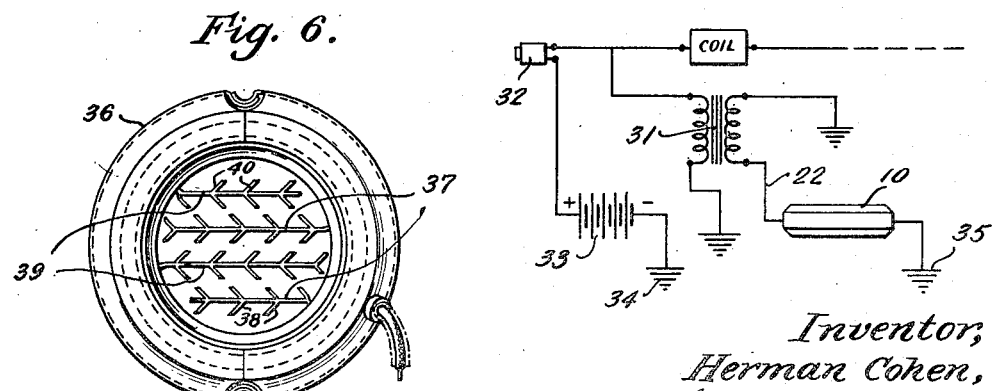

Patented Aug. 25, 1953

2,649,685

UNITED STATES PATENT OFFICE 2,649,685

CARBON MONOXIDE ELIMINATOR

Herman Cohen, Brookline, Mass.

Application August 4, 1949, Serial No. 108,621

3 Claims. (Cl. 60—30)

This invention relates to carbon monoxide eliminators adapted to convert the carbon monoxide present in the exhaust gases of an internal combustion engine or other combustion heater into carbon dioxide, and pertains more particularly to improvements in gas-converting apparatus adapted to be incorporated in the exhaust conduit of internal combustion engines of the type conventionally employed in motor vehicles, for the purpose of igniting and burning the carbon monoxide.

It is well known that one of the by-products of combustion of gasoline or fuel oil in an internal combustion engine is the extremely toxic carbon monoxide gas which is substantially colorless and odorless and hence difficult to detect. The toxic effect of the gas depends upon its concentration in the air which is inhaled and the time of such inhalation, and it is generally understood that a concentration of 1% of CO inhaled for ten minutes is very dangerous. It has also been demonstrated that the idling engine of an automobile in a one-car closed garage will produce sufficient exhaust CO to cause unconsciousness of the occupant in six minutes. It is also known that some persons have expedited the toxic concentration of carbon monoxide by sitting in a closed car, with a hose leading from the tail of the exhaust pipe to the interior of the car.

It is accordingly the principal purpose of the present invention to provide a carbon monoxide eliminator which may be readily connected between the exhaust manifold and exhaust pipe of an internal combustion engine, and which comprises a high temperature, electrically energized heating mechanism, so constructed and arranged that it not only effectively converts CO to $CO_2$, but also discourages any effort to by-pass or disconnect the wire leads to the heating mechanism and eliminates the possibility of accidental disconnection thereof. By this means the maximum safety features of the installation will be maintained against accidental or intentional abuse.

Another object of the invention is to provide a gas converting unit which is of simple and economical construction and which may be quickly and easily installed between the conventional coupling flanges of the exhaust manifold outlet and the inner end of the ordinary exhaust pipe, the convertor preferably having at least two independent sets of electrodes and ground elements so that one set will continue to operate if the other fails to function due to imperfection of the electrode plug.

A further object of the invention is to incorporate in the exhaust conduit between the manifold and the improved CO eliminator, an air intake unit constructed and arranged to draw in atmospheric air and mix the air with the exhaust gases, so that combustion of the CO will take place more quickly and effectively, when the exhaust system does not otherwise admit sufficient oxygen for adequate combustion.

Still other features and advantages of the invention will be apparent from the following description of the recommended embodiments of the invention shown on the accompanying drawings, and will be pointed out in the appended claims. It will be understood, however, that the structural details of the apparatus herein shown and described may be varied to suit particular purposes or conditions without departing from the essence of this invention as set forth in said claims. In the drawings, Fig. 1 is a side elevation, partly broken away and in section, of a CO eliminator installed in the exhaust conduit of an internal combustion engine and comprising the air intake and mixing unit in association with the gas converting unit; and optional position of the air intake being shown in broken lines;

Fig. 3 is a plan view, partly broken away and in section, of the gas converting unit shown in Fig. 1;

Fig. 4 is a diametrical section through the gas converting unit showing its location between the flanges of the air intake unit and the exhaust pipe respectively, shown in fragmentary section;

Fig. 6 is a plan view of a modified form of the gas converting unit, illustrating an optional arrangement of the electrodes; and Fig. 7 is a diagram of a recommended circuit for the gas converting unit.

Figure 1:
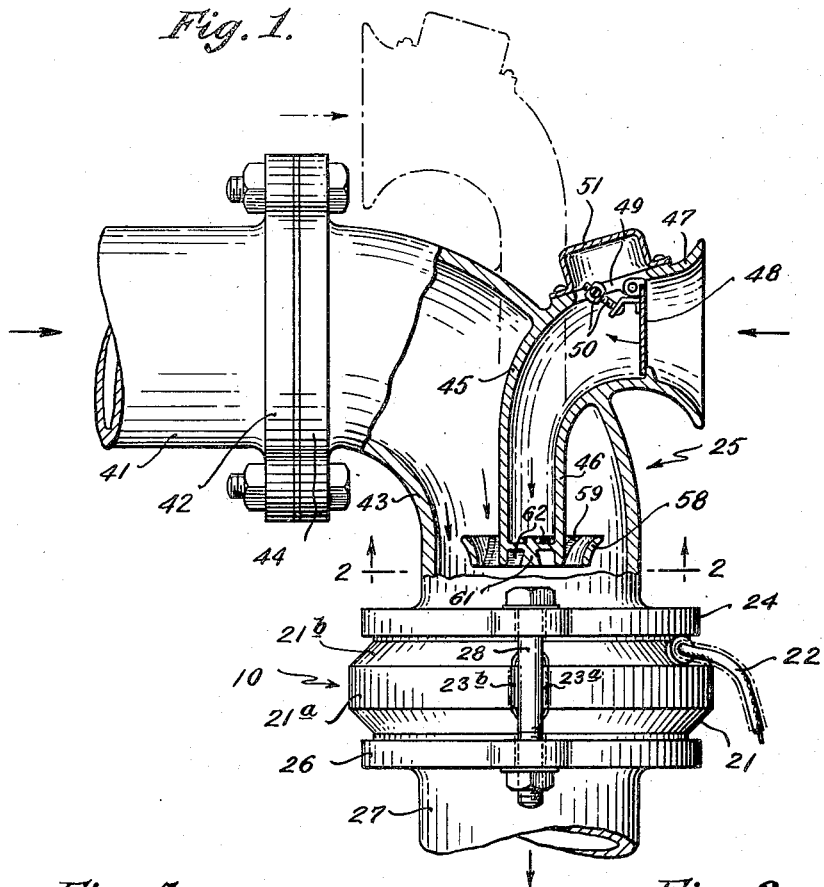

In the particular embodiment chosen for the purpose of illustration in Figs. 1 to 4, the converting unit of the carbon monoxide eliminator, shown generally at 10, comprises a metal ring 11, lined with a ring 12 of ceramic or other insulating material, a plurality of removable and replaceable, high tension spark plugs 13, conventionally mounted by nuts 14 in threaded openings disposed at spaced intervals on one side of the ring 11, and having electrodes 15 extending inwardly through openings 16 in the annular insulator 12; ground conductors 17 which may consist of metal bolts or screws extending inwardly through openings 18 in the insulator 12 from the ring 11 into which they are threaded at correspondingly spaced intervals on the opposite side of said ring; bridging conductors 19 interconnecting the terminals of the several plugs (three of which are shown) and attached to the plugs by nuts 20 or other fastenings; a metal cover 21 embracing the sides of the ring 11 and enclosing the plug terminals and the conductors 19; and a lead wire 22 passing through said cover and attached to one of the conductors 19 or to one of the plug terminals. The cover or casing 21 is preferably made in two half-ring sections 21a and 21b interconnected at opposite sides of the cover by inwardly curved, interfitting tongues 23a and 23b, respectively.

The converting unit 10 is designed to be clamped between the conventional flanges of elements of the exhaust conduit, by bolts and nuts similar to those employed for directly connecting those flanges together in the conventional system. As here shown, the converting unit is installed between the outer flange 24 of the air intake and mixing unit shown generally at 25, and the inner flange 26 of the conventional exhaust pipe 27. The bolts 28 used for clamping the flanges on opposite sides of the converting unit, with intervening gaskets 29 and 30, pass through the respective recesses formed by the interfitted curved tongues 23a and 23b of the casing 21. Thus, said casing cannot be removed to afford access to the plugs 13 or their conductors 19, without removing the bolts 28 and disassembling the convertor and its casing sections.

The lead wire 22 to the electrodes of the CO convertor is, as indicated in Fig. 7, preferably connected to a step-up transformer 31, in the circuit of the ignition switch 32 and conventional storage battery 33, to provide high tension at the electrodes and a hot flame at the spark tracks which jump across the open center of the unit from the electrodes to the complemental grounded conductors 17. The heat for converting the CO to $CO_2$ being supplied continuously at a temperature well above the ignition point of CO, so long as the ignition switch is closed to feed current to the motor and to the convertor unit. The battery 33 is conventionally grounded at 34, and the convertor is grounded at 35 through the metal ring 11 and the exhaust piping. Hence, the exhaust vapors passing through the exhaust pipe 27 and its conventional muffler are entirely free of carbon monoxide, or contain a harmless concentration of the unconsumed gas.

It will be observed that the electrodes and ground conductors are so arranged that the flames between complemental sparking elements pass diametrically across the open center of the convertor in intersecting paths, thus ensuring adequate combustion temperature at all regions within the convertor, especially at its center, when three plugs and three ground points are provided as herein recommended. The flaming spark from each electrode to its ground point substantially traverses the base of the insulator 12 when the elements are spaced as in Fig. 3. The provision of a plurality of independently operative spark gaps further ensures the supply of adequate heat, even though one of the plugs should fail. Positive ignition and combustion of the CO is thus ensured at all times while the vehicle engine is in operation, so long as one of the plugs continues to function.

The modified convertor unit shown in Fig. 6 of the drawing is similar to the unit above described, except for a change in the form of the electrodes and ground conductors. The electrodes 37 (two in number) extend substantially across the central opening formed by the rings of the device, and are provided with lateral prongs 38 which provide a plurality of sparking points on each electrode. The ground conductors 39 are of corresponding length and shape, are disposed in spaced parallel relation to said electrodes, and have prongs 40 providing ground points spaced adjacent the sparking points of the electrodes 37. Other forms and arrangements of the electrodes and ground conductors or points may be utilized, if desired.

The air intake and mixing unit 25 which is preferably associated in use with the CO convertor unit 10 to ensure an adequate supply of oxygen, is connected between said convertor unit and the outlet 41 of the exhaust manifold of the engine, said outlet end having a conventional coupling flange 42.

In the form shown in Fig. 1, the unit 25 comprises a pipe section 43, preferably of curved or elbow shape, having a flange 44 at its inner end which is bolted to the flange 42. The flange 24 at the opposite end of the pipe section 43 is bolted to the gas converting unit as above described. An air intake pipe 45 having an inner end 46 disposed substantially concentrically within the outer end of the elbow 43 and pointing in the direction of flow of the exhaust gases toward the unit 10, and having an exterior, bell shaped mouth or port 47, is cast as an integral portion of the pipe 43, or otherwise suitably mounted therein. The intake pipe is so positioned that its mouth 47 points in the direction of air flowing toward the carbon monoxide eliminator, for example, toward the radiator fan or front of the engine of the vehicle in which the device is installed.

Figure 5:
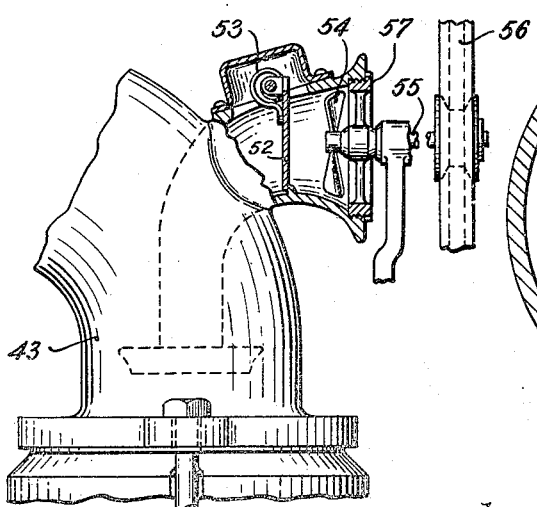
Fig. 5 is a fragmentary elevation partly broken away and in section of a modified form of the air intake unit.

A butterfly check valve 48 is pivoted within an opening 49 of the intake port 45, the operative position of the valve being regulated by an adjustable counterweight 50 comprising screw and nut accessible for adjustment through said opening which is normally covered by a cap 51, removably fastened in place. The counterweight 50 normally holds the valve in closed position but permits the valve to open under increased air pressure. In the modified arrangement shown in Fig. 5, the corresponding check valve 52 is held normally closed by a coiled spring 53 which yields to air pressure on the outer surface of the valve, so that the position of the valve is automatically regulated according to such air pressure. It will be understood that the valve arrangement of Fig. 5 may be incorporated in the air intake shown in Fig. 1, if desired; and it will be appreciated that the spring 53 or the optional counterweight 50, holds the valve closed while the motor is idling, but yields to permit the valve to open when the motor is speeded up, or when the vehicle is in motion. The conventional radiator fan provides increased air pressure in the arrangement shown in Fig. 1. In the optional arrangement of Fig. 5, an auxiliary fan 54 is driven by a shaft 55 rotated by the conventional fan belt 56 which operates the conventional cooling fan and generator of the ordinary automobile engine. The fan shaft 55 may be journaled in a spider 57 screwed into the bell mouth of the air intake, so that the auxiliary blower fan 54 is disposed within said mouth and adjacent the butterfly valve.

The inner end 46 of the air intake pipe is provided with a flaring collar 58 so that the pipe end 46 acts as a Venturi tube. The collar 58 is spaced from the pipe end 46 by radial webs 59 which are inclined with respect to the plane of the collar, so that said webs constitute vanes for deflecting and circulating the exhaust gases passing through the openings 60 between the collar 58 and the pipe end. The exhaust gases are thus circulated in the direction of the larger arrow shown in Fig. 2.

Figure 2:
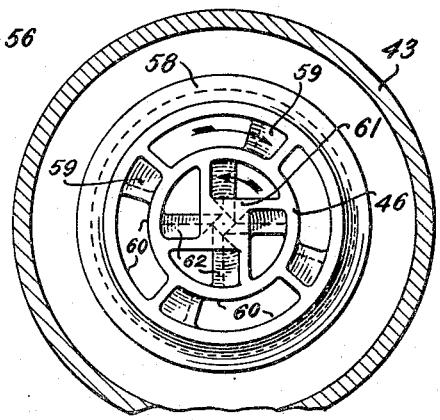
Fig. 2 is an enlarged section, partly broken away, taken on line 2—2 of Fig. 1.

The inner end of the intake pipe is also provided with an interior spider 61 having radial vanes 62, inclined in a direction opposite to that of the vanes 59, so that air drawn through the intake pipe by the Venturi tube (and accelerated by the radiator fan, or the fan blower 54 above described) is circulated in a direction opposite to that of the exhaust gases as indicated by the smaller arrow in Fig. 2. The provision of these air circulating devices thus causes the exhaust gases from the manifold and the fresh air drawn through the intake 45 to be swirled and intimately mixed in the space between the end of the venturi and the underlying convertor unit 10, by the turbulent action of the oppositely directed streams. Hence, the CO gas from the exhaust will be thoroughly intermixed with sufficient oxygen from the air to ensure thorough combustion of the CO and its conversion to $CO_2$ when the intermixed gases pass through the flame space of the convertor 10.

The intermixed gases are preferably deflected toward the center of the convertor, where the heat is most intense, by providing an inwardly curved or inclined flange 63 around the inner wall of the insulator 12, at its inner side, as best shown in Figs. 3 and 4. The deflecting flange 63 may be an integral part of said ring, as shown, or may be suitably attached thereto.

If necessary to avoid excessive back pressure in the exhaust pipe or muffler due to the admission of air through the intake 45, the exhaust pipe 27 and the muffler (not shown) may be of larger diameter than that normally employed in a particular installation. Back pressure may also be avoided by providing a conventional venturi construction in the tail pipe of the exhaust (not shown). The size of the auxiliary blower 54 (Fig. 5) would be determined by the size of the exhaust pipe, in relation to the amount of additional air needed to ensure complete conversion of the carbon monoxide gas. The weighted or spring actuated butterfly valve will, of course, permit air to be drawn or forced through the intake pipe 45 at a rate and volume proportionate to the increased rate of flow of the exhaust gases due to increased speed of the motor.

I claim:

1. A carbon monoxide eliminator connectable in the exhaust conduit of an internal combustion engine and comprising a gas convertor unit adapted to be clamped between coupling flanges on parts of said conduit and having a metallic ring, an annular insulator provided with a plurality of radial openings disposed within and lining the metallic ring, at least one spark plug removably mounted in said ring and having an electrode projecting inwardly through one of said openings, at least one ground conductor mounted in the opposite side of said ring and projecting inwardly through another of said openings, and a conductor for high tension current connected to said plug for producing a flaming spark between said electrode and ground conductor, said insulator having an interior annular flange for deflecting toward its center the exhaust gases passing through said unit, and said electrode and ground conductor being disposed in spaced parallel relation, and each having lateral prongs providing a plurality of complemental spark gaps, some of which are located adjacent the central region of said unit.

2. A carbon monoxide eliminator connectable in the exhaust conduit of an internal combustion engine and comprising a gas convertor unit adapted to be clamped between coupling flanges on parts of said conduit and having a metallic ring, an annular insulator provided with a plurality of radial openings disposed within and lining the metallic ring, at least one spark plug removably mounted in said ring and having an electrode projecting inwardly through one of said openings, at least one ground conductor mounted in the opposite side of said ring and projecting inwardly through another of said openings, and a conductor for high tension current connected to said plug for producing a flaming spark between said electrode and ground conductor, and a cover embracing said ring and enclosing said plug and a portion of said current conductor, said cover consisting of two half-ring sections each having complemental, inwardly curved tongues interfitting to connect the sections in closed position, the curved interfitted tongues being adapted to receive portions of a pair of conventional bolts for clamping said coupling flanges on opposite sides of said unit, whereby the cover is held closed until said bolts are removed.

3. A carbon monoxide eliminator connectable in the exhaust conduit of an internal combustion engine and comprising a gas convertor unit adapted to be clamped between coupling flanges on parts of said conduit and having a metallic ring, an annular insulator provided with a plurality of radial openings disposed within and lining the metallic ring, at least one spark plug removably mounted in said ring and having an electrode projecting inwardly through one of said openings, at least one ground conductor mounted in the opposite side of said ring and projecting inwardly through another of said openings, and a conductor for high tension current connected to said plug for producing a flaming spark between said electrode and ground conductor, said insulator having an interior annular flange for deflecting toward its center the exhaust gases passing through said unit.

HERMAN COHEN.

References Cited in the file of this patent

UNITED STATES PATENTS

| Number | Name | Date |
|---|---|---|
| 1,605,484 | Thompson et al. | Nov. 2, 1926 |
| 1,843,999 | White | Feb. 9, 1932 |
| 2,216,653 | Sauer | Oct. 1, 1940 |

FOREIGN PATENTS

| Number | Country | Date |
|---|---|---|
| 631,736 | France | Sept. 20, 1927 |
| 636,038 | France | Jan. 6, 1928 |
| 580,807 | Germany | July 17, 1933 |
| 386,901 | Great Britain | Jan. 26, 1933 |